US008581173B2

(12) United States Patent
Schunk

(10) Patent No.: US 8,581,173 B2
(45) Date of Patent: Nov. 12, 2013

(54) FIBER OPTIC TRANSCEIVER MODULE HAVING A MOLDED COVER IN WHICH AN OPTICAL BEAM TRANSFORMER MADE OF AN ELASTOMER IS INTEGRALLY FORMED

(75) Inventor: Nikolaus W. Schunk, Maxhuette-Haidhof (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 456 days.

(21) Appl. No.: 12/912,996

(22) Filed: Oct. 27, 2010

(65) Prior Publication Data
US 2012/0104240 A1 May 3, 2012

(51) Int. Cl.
*H01J 5/16* (2006.01)
*H01J 5/02* (2006.01)
*G02B 6/36* (2006.01)

(52) U.S. Cl.
USPC .............................. 250/216; 250/239; 385/93

(58) Field of Classification Search
USPC .......... 250/216, 239, 227.24, 227.11, 227.28, 250/227.29; 385/27, 31, 33, 34, 35, 39, 76, 385/78, 79, 88, 89, 90, 91, 92, 93, 94, 147; 398/141, 200, 201, 207, 212, 214; 257/788, 678, 795, 99, 100, 98, 428, 257/431, 432, 433, 434; 359/655, 796, 808, 359/809, 810, 811, 819, 820, 896, 641
See application file for complete search history.

(56) References Cited

U.S. PATENT DOCUMENTS

| RE34,790 | E | * | 11/1994 | Musk ............................... 385/93 |
| 5,515,468 | A | * | 5/1996 | DeAndrea et al. .............. 385/88 |
| 5,522,000 | A | * | 5/1996 | Ayliffe et al. ................... 385/88 |
| 5,778,127 | A | * | 7/1998 | Gilliland et al. ................ 385/92 |
| 5,812,717 | A | * | 9/1998 | Gilliland ......................... 385/93 |
| 6,147,817 | A | * | 11/2000 | Hashizume ................... 359/819 |
| 6,467,972 | B2 | | 10/2002 | Setoguchi |
| 6,741,408 | B2 | * | 5/2004 | Beattie et al. ................. 359/820 |
| 7,121,738 | B2 | * | 10/2006 | Baur ............................... 385/88 |
| 7,298,941 | B2 | * | 11/2007 | Palen et al. ..................... 385/33 |
| 7,300,217 | B2 | | 11/2007 | Mizoguchi |
| 7,330,492 | B2 | | 2/2008 | Ohe et al. |
| 7,358,599 | B2 | | 4/2008 | Ohe et al. |
| 2003/0123155 | A1 | * | 7/2003 | Quake et al. .................. 359/664 |
| 2006/0001133 | A1 | | 1/2006 | McGarvey et al. |

* cited by examiner

*Primary Examiner* — Pascal M Bui Pho
*Assistant Examiner* — Jennifer Bennett

(57) ABSTRACT

An FOT module is provided that has a molded cover in which an optical beam transformer is integrally formed. The molded cover includes at least a nontransparent molded part that is secured to a mounting structure, such as a molded leadframe or a PCB, on which at least one active optical device is mounted. The material of which the nontransparent molded part is made has a CTE that matches, or nearly matches, the CTE of the body of the mounting structure. Consequently, exposure of the FOT module to temperature variations will not result in delaminations at the interface of the mounting structure and the nontransparent molded part.

20 Claims, 6 Drawing Sheets

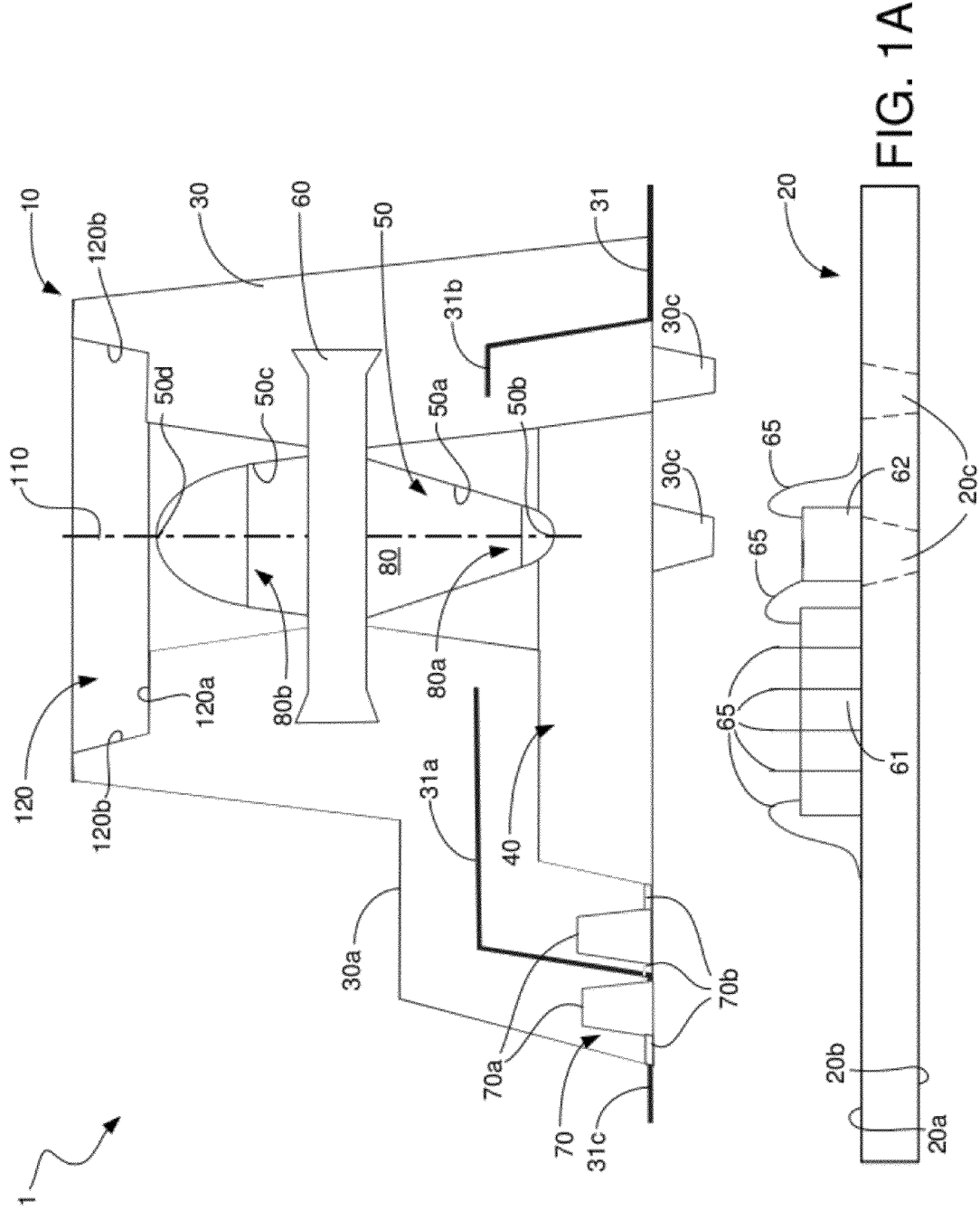

FIBER OPTIC TRANSCEIVER MODULE HAVING A MOLDED COVER IN WHICH AN OPTICAL BEAM TRANSFORMER MADE OF AN ELASTOMER IS INTEGRALLY FORMED

TECHNICAL FIELD OF THE INVENTION

The invention relates to fiber optic transceiver (FOT) modules and, more particularly, to an FOT module having an optics system integrally formed in a cover of the FOT module, and that is designed in such a way that problems associated with delamination are avoided.

BACKGROUND OF THE INVENTION

In optical communications applications, optical transmitter modules are used to generate optical data signals, which are then transmitted over an optical waveguide, which is typically an optical fiber. An optical transmitter module includes a driver integrated circuit (IC) that receives an electrical data signal containing bits of data at its input, and produces, at its output, an electrical drive current signal. The electrical drive current signal is applied to a light source, such as, for example, a laser diode or light emitting diode (LED), which causes it to emit an optical data signal. An optics system (e.g., a lens) receives the optical data signal and couples the optical data signal into the end of an optical fiber, which then transmits the optical data signal over a network to some destination.

An optical receiver module includes a photo detector such as, for example, a photodiode, which receives an optical data signal transmitted over an optical fiber. An optics system (e.g., a lens) of the receiver module couples the optical data signal from the optical fiber end onto the photodiode. The photodiode converts the optical data signal into an electrical data signal. Electrical circuitry (e.g., amplifiers, filters, and clock and data recovery circuitry) of the receiver module conditions the electrical data signal and recovers the data bits.

Optical transmitter and optical receiver modules may be packaged separately, but are often packaged together in an optical transceiver module to provide a single package that has both transmit and receive functionality. A variety of optical transceiver modules are in use today. An optical transceiver module may have multiple transmit channels and multiple receive channels or a single transmit channel and a single receive channel. One common optical transceiver module design of the latter type is commonly referred to as a Fiber Optic Transceiver (FOT) module design.

A typical FOT module includes a metal leadframe that is secured to a molded housing. A printed circuit board (PCB) disposed within the molded housing has various electrical components mounted thereon, including one or more active optical elements (e.g., a laser diode and/or a photodiode) and one or more integrated circuits (ICs) (e.g., a laser diode or LED driver IC and/or a receiver IC). The electrical components have electrical contact pads that are electrically coupled via bond wires to the leads of the leadframe. The molded housing typically comprises a polymer material that is transparent to the primary wavelength of light of the FOT module. An optics system is formed in or secured to the molded housing. The end of at least one optical fiber is secured to the molded housing adjacent the optics system. The optics system optically couples light between the end of the optical fiber and the active optical element.

One of the disadvantages of FOT modules of the type described above is that the coefficients of thermal expansion (CTEs) of the metal leadframe and of the molded housing differ greatly. For example, the CTE of the molded housing may be 70 to 100 parts per million (ppm) per degree Celsius (ppm/° C.), whereas the CTE of the metal leadframe may be 17 ppm/° C. This large difference between the CTEs can result in movement of the leadframe and of the molded housing relative to one another during exposure of the FOT module to temperature variations. The highest stress levels between the leadframe and the molded housing typically occur during the solder reflow process, during which temperatures of around 260° C. are typically sustained for relatively long periods of time (e.g., 10 seconds). Consequently, delaminations may occur at the interface of the leadframe and the molded housing, which can cause the bond wires to break, resulting in a defective FOT module.

One possible solution to the delamination problem is to include glass filler nano particles in the material of which the molded housing is made to lower its CTE to more closely match the CTE of the metal leadframe. The disadvantage to this solution is that the inclusion of the nano particles in the housing material results in Rayleigh scattering of light as the light attempts to propagate through the molded housing. This scattering of the light reduces the transparency of the housing, and thus reduces the optical coupling efficiency of the FOT module. Therefore, this solution is only partially effective and is not suitable for use in all cases.

Another proposed solution to the delamination problem involves using a transistor outline (TO)-can design for the FOT module. This solution eliminates delaminations and broken bond wires, but is not easily realizable in FOT modules because it requires that the electrical pins of the module be bent by an angle of 90°.

Integrated circuits (IC) are typically implemented as dual in-line pin (DIP) packages. A DIP package typically includes a plastic molded housing secured to a copper leadframe. The plastic material of which the molded housing is made includes a glass filler material that lowers the CTE of the molded housing such that the difference between the CTE of the copper leadframe and that of the molded housing is relatively small. By making the difference between the CTEs of the copper leadframe and of the molded housing relatively small, the potential for delaminations occurring due to temperature fluxuations is relatively small. The inclusion of the glass filler material in the plastic material, however, makes the housing nontransparent.

Accordingly, a need exists for an FOT module that is manufactured in such a way that problems associated with delaminations and broken bond wires are avoided.

SUMMARY OF THE INVENTION

The invention is directed to an FOT module comprising a mounting structure, at least a first active optical device mounted on a mounting surface of the mounting structure, and a cover secured to the mounting structure and covering at least the active optical device. The cover comprises a nontransparent molded part having first and second cavities formed therein. The first cavity provides space for at least the first active optical device mounted on the mounting surface of the mounting structure. The nontransparent molded part is nontransparent to the primary wavelength of light used by the FOT module. The nontransparent molded part comprises a material that has a CTE that matches, or substantially matches, the CTE of the body of the mounting structure. The cover has an opening formed therein for mechanically coupling an end of an optical waveguide to the cover. An elastomeric material that is transparent to the primary wavelength of light used by the FOT module is disposed in the second cavity. The second cavity filled with the transparent elastomeric material operates as an optical beam transformer for transforming a light beam passing into the optical beam transformer and coupling the transformed light beam between the active optical device and the end of the optical waveguide.

Because the nontransparent molded part comprises a material that has a CTE that matches, or substantially matches, the CTE of the body of the mounting structure, exposure of the FOT module to temperature variations will not result in delaminations at the interface of the mounting structure and the nontransparent molded part of the cover.

These and other features and advantages of the invention will become apparent from the following description, drawings and claims.

BRIEF DESCRIPTION OF THE DRAWINGS

FIG. 1A illustrates a side plan view of the FOT module in accordance with an illustrative or exemplary embodiment prior to a cover of the FOT module being secured to a PCB of the FOT module.

DETAILED DESCRIPTION OF AN ILLUSTRATIVE EMBODIMENT

In accordance with embodiments described herein, an FOT module is provided that has a mounting structure such as a leadframe or a printed circuit board (PCB), a molded cover that is secured to the mounting structure, and an optical beam transformer integrally formed in the molded cover. The molded cover comprises a nontransparent molded part that has a lower portion in which a first cavity is formed and an upper portion in which a second cavity is formed. The first cavity provides space for components mounted on an upper surface of the mounting structure. The second cavity is shaped to form a lens structure that is capable of performing optical beam transformation. The second cavity is filled with a transparent elastomeric material to form the optical beam transformer. The optical beam transformer optically transforms light beams and couples them between at least one active optical device mounted on the upper surface of the mounting structure and an end of at least one optical waveguide mechanically coupled between the molded cover.

The material of which the nontransparent molded part of the cover is made has a CTE that matches, or nearly matches, the CTE of the portion of the mounting structure to which the cover is secured. Consequently, exposure of the FOT module to temperature variations will not result in delaminations at the interface of the mounting structure and the cover. The elastomeric material that fills the second cavity has an elasticity that allows it to expand and contract as the molded cover expands and contracts. Consequently, exposure of the FOT module to temperature variations also will not result in delaminations at the interface of the molded cover and the elastomeric material.

Figure 1B:
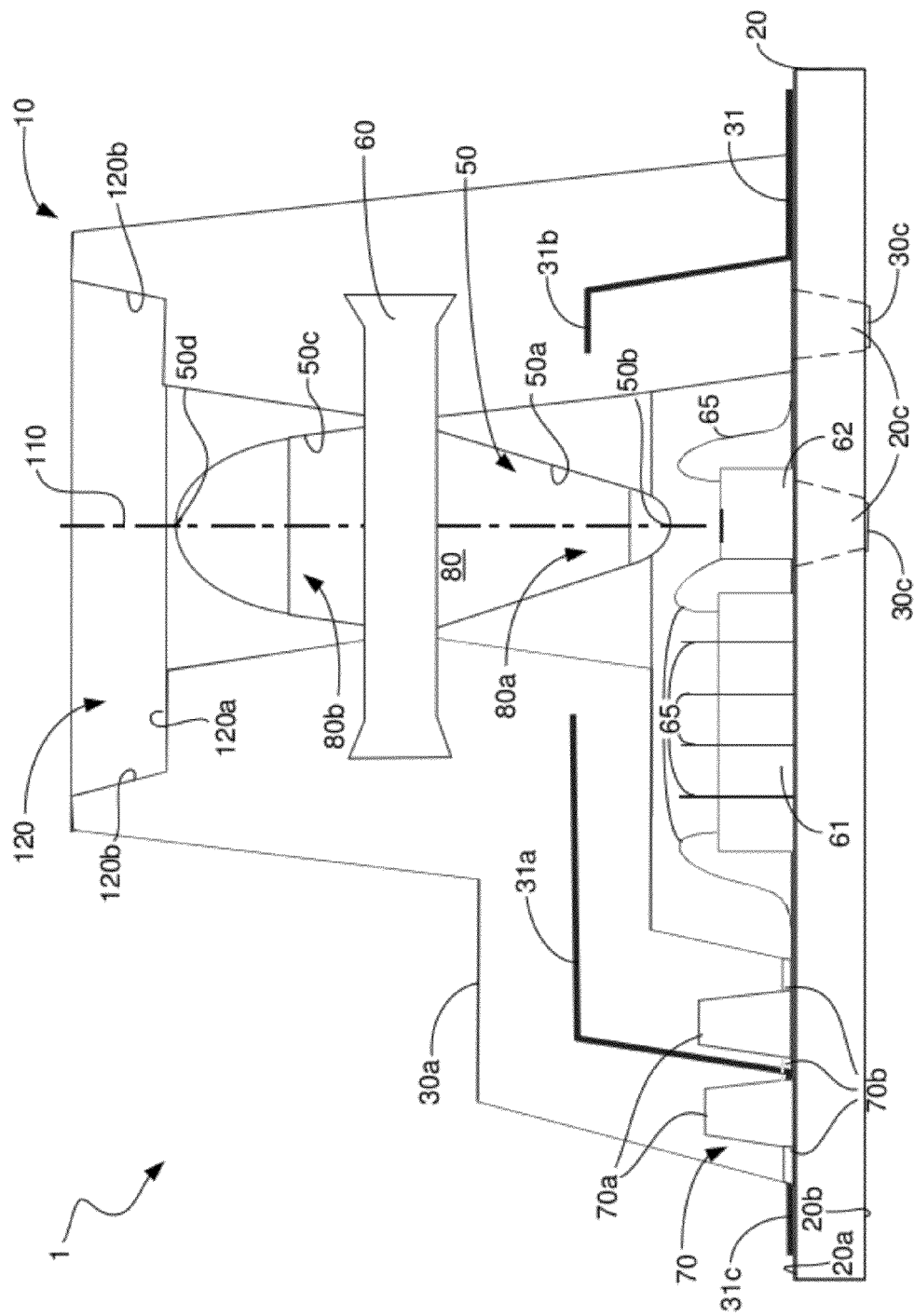
FIG. 1B illustrates a side plan view of the FOT module shown in FIG. 1A after the cover of the FOT module has been secured to the PCB of the FOT module.

FIG. 1A illustrates a side plan view of the FOT module 1 in accordance with an illustrative or exemplary embodiment prior to a molded cover 10 of the FOT module 1 being secured to a mounting structure 20 of the FOT module 1. The term "mounting structure" will be used herein to denote a PCB, a premolded leadframe, a printed wiring board (PWB), or similar structures on which components can be mounted and electrically connected. In accordance with this illustrative embodiment, the mounting structure 20 is a multi-layer PCB. FIG. 1B illustrates a side plan view of the FOT module 1 shown in FIG. 1A after the molded cover 10 of the FOT module 1 has been secured to the PCB 20 of the FOT module 1. The FOT module 1 in accordance with this embodiment will be described with reference to FIGS. 1A and 1B.

The molded cover 10 comprises a nontransparent molded part 30 having a first cavity 40 and a second cavity 50 formed therein. The first cavity 40 provides space for components 61 and 62 mounted on the upper surface 20a of the PCB 20 and for the bond wires 65 that electrically interconnect the components 61 and 62 with each other and/or with the PCB 20. The components 61 and 62 vary in type depending on whether the FOT module 1 is configured as an optical transmitter module, an optical receiver module, or an optical transceiver module. For example, if the FOT module 1 is configured as an optical transmitter module, the components 61 and 62 include at least a driver IC and an electrical-to-optical (E/O) converter, respectively. In that case, the E/O converter 62 is typically either a laser diode or an LED. If the FOT module 1 is configured as an optical receiver module, the components 61 and 62 include at least a receiver IC and an optical-to-electrical (O/E) converter, respectively. In that case, the O/E converter 62 is typically a photodiode. If the FOT module 1 is configured as an optical transceiver module, the components that are mounted on the upper surface 20a of the PCB 20 typically include a driver IC and an E/O converter on the TX side and a receiver IC and an O/E converter on the RX side. Thus, the term "FOT module", as that term is used herein, is intended to denote an optical receiver module, an optical transmitter module, or an optical transceiver module.

A first cavity wall 50a of the second cavity 50 defines a first inverse cone-like structure that tapers outwards as it extends up and away from an apex 50b of the first inverse cone-like structure. A second cavity wall 50c of the second cavity 50 defines a second inverse cone-like structure that tapers outwards as it extends down and away from an apex 50d of the second inverse cone-like structure. The apexes 50b and 50d are positioned opposite one another along a common optical axis 110. The first and second cavity walls 50a and 50c meet in a central region to form a cylindrical portion (not shown) about which a clamp structure 60 is secured. Together, the first and second inverse cone-like structures form a dual, inverse cone-like structure. The dual, inverse cone-like structure is filled with a transparent elastomeric material (not visible in the figures) to form the optical beam transformer 80 of the FOT module 1. The optical beam transformer 80 has a first lens portion 80a and a second lens portion 80b. The optical axis 110 corresponds to the optical axes of the first and second lens portions 80a and 80b. The optical axis 110 also corresponds to the optical axis of the component 62, which is an active optical device.

A material is "transparent", as that term is used herein, if the material passes, or transmits, light of a primary wavelength of the E/O or O/E converter represented by component 62. A material is "nontransparent", as that term is used herein, if the material blocks, or absorbs, light of the primary wavelength of the E/O or O/E converter represented by component 62. An example of a suitable material for filling the second cavity 50 is Geniomer® thermoplastic silicone elastomeric material, which is a product supplied by Wacker Chemie AG, a German company. The invention is not limited with respect to the material that is used for this purpose except that the material should have suitable elasticity and transparency characteristics and should be able to withstand temperatures within the range to which the FOT module 1 will be exposed.

The molded cover 10 having the first and second cavities 40 and 50 formed therein is typically realized by using a known two-component injection molding process. During the two-component injection molding process, a molding tool (not shown) is set to a volume corresponding to the shape of the optical beam transformer 80. The molding tool is then filled with the transparent elastomeric material and the material is cured. The molding tool is then set to a volume corresponding to the shape of the nontransparent molded part 30. The molding tool is then filled with the nontransparent polymeric material and the material is cured. Other manufacturing techniques may also be used for this purpose, as will be understood by persons of ordinary skill in the art in view of the description being provided herein. For example, the optical beam transformer 80 may be premolded into the inverse cone-like structure defined by the first and second cavity walls 50a and 50c. The premolded inverse cone-like structure would then be placed into the molding tool, which would then be closed and filled with the nontransparent polymeric material. The nontransparent polymeric material would then be cured to form the nontransparent molded part 30.

The material that is used to make the nontransparent molded part 30 of the cover 10 is typically the same nontransparent polymeric material that is commonly used to make DIP packages. As indicated above, the nontransparent plastic material that is used for this purpose has a CTE that is relatively close to the CTE of the PCB 20. Consequently, as the temperature of the FOT module 1 varies, the nontransparent molded part 30 and the PCB 20 will expand and contract by about the same amount, which prevents delaminations from occurring. The invention is not limited with respect to the material that is used for the outer nontransparent molded part 30 except that the material should have a CTE that is relatively closely matched to the CTE of the leadframe or PCB 20.

The cover 10 is typically secured to the upper surface 20a of the PCB 20 using an adhesive material, such as epoxy or glue, for example, although a latching mechanism (not shown) may instead be used for this purpose. The first cavity 40, which provides space for the components 61 and 62 that are mounted on the upper surface 20a of the PCB 20, may be filled with air or nitrogen. A meander structure 70 formed in the nontransparent molded part 30 compensates for changes in pressure in the first cavity 40 that are caused by changes in the temperature of the FOT module 1. The meander structure 70 is also configured to prevent contaminants from entering the first cavity 40 and interfering with the operations of the components 61 and 62. The meander structure 70 typically has large volume sections 70a that extend in directions that are perpendicular to the plane of the drawing page and smaller volume sections 70b that extend in directions that are parallel to the drawing page. As an air stream flows through the meander structure 70, the air stream slows in the larger volume sections 70a, causing particulates in the air to fall out of the air so that they do not enter and contaminate the first cavity 40.

Alignment pins 30c are formed on the outer surface 30a of the nontransparent molded part 30. Alignment openings 20c formed in the upper surface 20a of the PCB 20 have shapes that are complementary to the shapes of the alignment pins 30c such that the respective alignment pins 30c are received with a precision fit in the respective alignment openings 20c. The mating of the alignment pins 30c with the alignment openings 20c ensures that the optical beam transformer 80 is optically aligned with the E/O or O/E converter represented by component 62. An opening 120 in the molded cover 10 is configured to mate with the end of a ferrule (not shown) that holds an end of an optical waveguide (not shown), such as a plastic or glass optical fiber. For exemplary purposes, it will be assumed herein that the optical waveguide is an optical fiber. The opening 120 is defined by a ledge 120a and side walls 120b. The end of the ferrule (not shown) is seated on the ledge 120a and is surrounded by the side walls 120b. When the end of the ferule is mated with the opening 120, the core of the optical waveguide held by the ferrule, the first and second lens portions 80a and 80b, and a radiation axis of the component 62 are all optically aligned along the optical axis 110.

The optical beam transformer 80 is shaped to operate on light in a particular manner. If the component 62 is an E/O converter, light produced by the E/O converter 62 is collimated by the first lens portion 80a and then focused by the second lens portion 80b to a focal point on the end of the optical fiber (not shown) attached to the ferrule (not shown) that is secured to opening 120. If the component 62 is an O/E converter, light passing out of the end of the fiber attached to the ferrule is collimated by the second lens portion 80b and then focused by the first lens portion 80a to a focal point on the O/E converter 62.

As will be described below in more detail with reference to FIG. 5, the ferrule that is received within opening 120 may be contained within a plug (not shown) that can be "blindly" attached to the FOT module 1 without potentially damaging the end face of the fiber that is held within the ferrule. In order to provide this capability, the ledge 120a is spaced at least 1.3 millimeters (mm) apart from the outer surface 30a of the nontransparent molded part 30 that abuts the end of the plug. The length of the optical beam transformer 80 (i.e., the distance between apexes 50b and 50d along optical axis 110) is based on this distance. It should be noted, however, that it is not necessary to use a ferrule and/or a plug with the FOT module 1. It is possible to attach the end of the optical fiber directly to the opening 120, or to use some other mechanism for mechanically coupling the optical fiber to the opening 120. In the latter case, the distance between the outer surface 30a and the ledge 120a may be, but need not be, greater than 1.3 mm.

In accordance with the illustrative embodiment shown in FIGS. 1A and 1B, metal portions 31a and 31b of a metal leadframe 31 are embedded in the nontransparent molded part 30 of the cover 10. After securing the cover 10 to the mounting structure 20, which, in accordance with this embodiment, is a multi-layer PCB, electrical contacts 31c of the metal leadframe 31 are soldered to ground contacts (not shown) disposed on the upper surface 20a of the PCB 20. The ground contacts (not shown) are in contact with a ground layer inside of the multi-layer PCB 20 such that the metal leadframe 31 forms an electromagnetically shielding cage for the FOT module 1. The metal leadframe 31 is optional, but is desirable in some cases.

Figure 2:
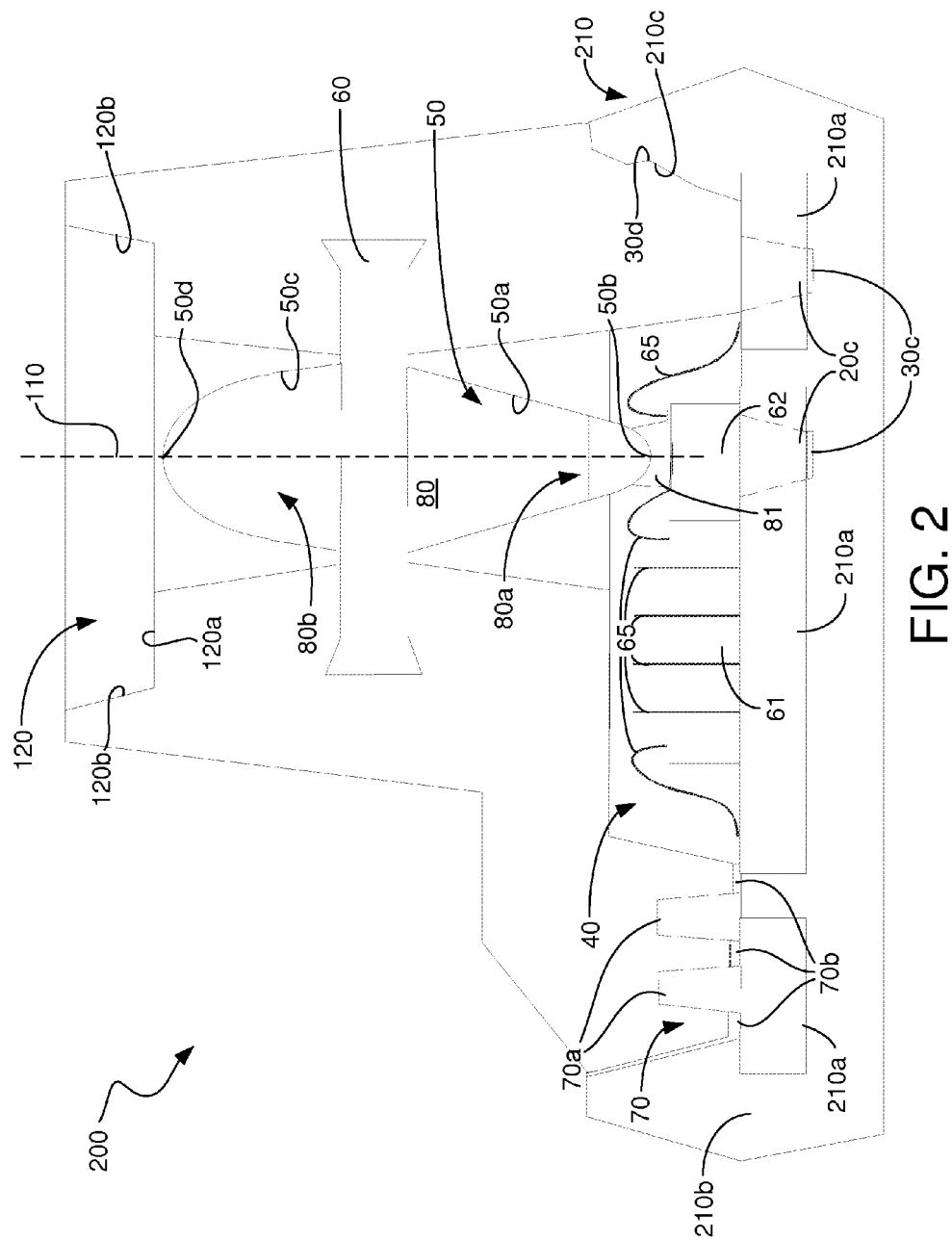
FIG. 2 illustrates a side plan view of an FOT module in accordance with another illustrative embodiment of the invention in which the FOT module includes a molded leadframe to which the cover of the FOT module is secured.

FIG. 2 illustrates a side plan view of an FOT module 200 in accordance with an illustrative embodiment of the invention. The FOT module 200 is identical to the FOT module 1 shown in FIGS. 1A and 1B except that the FOT module 200 includes a premolded leadframe 210 instead of the PCB 20. Like reference numerals in FIGS. 1A-2 represent like elements or features. The premolded leadframe 210 comprises a leadframe 210a for electrical bonding and heat dissipation and a premolded leadframe body 210b. The nontransparent molded part 30 of the cover 10 and the premolded leadframe body 210b are typically made of the same type of plastic material. Therefore, the outer nontransparent molded part 30 and the premolded leadframe body 210b have CTEs that are equal, or substantially equal, to each other. Consequently, the nontransparent molded part 30 and the premolded leadframe body 210b will expand and contract by essentially the same amounts as the FOT module 200 is exposed to temperature variations. This feature prevents delaminations at the interface between the premolded leadframe body 210b and the nontransparent molded part 30.

The nontransparent molded part 30 of the cover 10 may be secured to the premolded leadframe body 210b by an adhesive material, such as glue or epoxy, for example. Alternatively, the nontransparent molded part 30 and the premolded leadframe body 210b may have latching elements 30d and 210c, respectively, formed on them that engage each other to lock the cover 10 to the premolded leadframe body 210b. A gap exists in the first cavity 40 between the upper surface of the component 62 and the first lens portion 80a. In accordance with the illustrative embodiment of FIG. 2, this gap is filled with a soft silicon material 81. The soft silicon material 81 reduces reflection at the surface of the first lens portion 80a.

Figure 3:
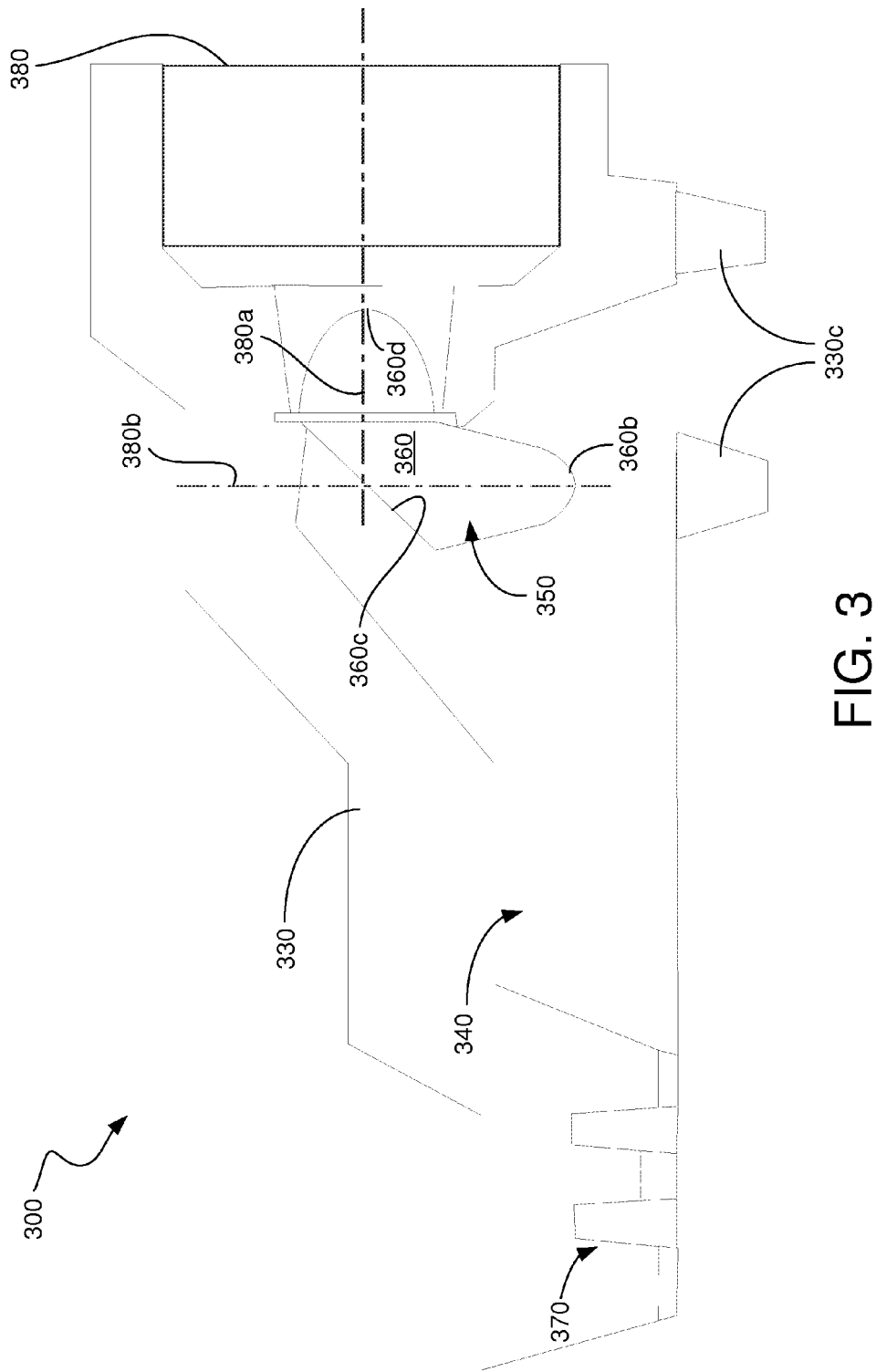
FIG. 3 illustrates a side plan view of an FOT module in accordance with another illustrative embodiment.

FIG. 3 illustrates a side plan view of a molded cover 300 of an FOT module in accordance with another illustrative embodiment. The molded cover 300 is similar to the cover 10 (FIGS. 1A-2) in that it is made up of a nontransparent molded part 330 having a first cavity 340 and a second cavity 350 formed therein. Like the first cavity 40 shown in FIGS. 1A-2, the first cavity 340 provides space for components (not shown) mounted on an upper surface of a mounting structure (not shown) to which the cover 300 is secured. Like the second cavity 50 shown in FIGS. 1A-2, the second cavity 350 is filled with a transparent elastomeric material (not visible in FIG. 3) to form an optical beam transformer 360. The optical beam transformer 360 performs the functions described above with reference to FIGS. 1A-2 of optically coupling light between an end of an optical fiber (not shown) and an active optical device (not shown). The nontransparent molded part 330 comprises the same material as the nontransparent molded part 30 shown in FIG. 1A. The transparent elastomeric material that is used to fill the second cavity 350 is the same as the transparent elastomeric material that is used to fill the second cavity 50 shown in FIGS. 1A-2. The molded cover 300 may be made in the same manner, described above, in which the molded cover 10 is made.

An adhesive material (not shown) or latching elements (not shown) may be used to secure the cover 300 to a mounting structure, such as, for example, the PCB 20 shown in FIGS. 1A and 1B or the premolded leadframe 210 shown in FIG. 2. For ease of illustration, the mounting structure is not shown in FIG. 3. The nontransparent molded part 330 has alignment pins 330c thereon that perform the alignment functions described above with reference to the alignment pins 30c shown in FIGS. 1A-2. A meander structure 370 that performs the same functions as the meander structure 70 shown in FIGS. 1A and 2 is formed in the cover 300.

The cover 300 shown in FIG. 3 has an opening 380 therein that is similar to opening 120 shown in FIGS. 1A-2 for attaching a ferrule (not shown) or optical fiber (not shown) thereto to align an end of the optical fiber (not shown) to the cover 300. An optical axis 380a of the opening 380 is orthogonal to the optical axis 380b of the active optical device (not shown) mounted on the mounting structure (not shown).

The optical beam transformer 360 acts as an optics system that collimates, bends and focuses light. In a transmit mode, divergent light produced by an E/O converter (not shown) is collimated as it passes into a first lens portion 360b of the optical beam transformer 360. A surface 360c of the optical beam transformer 360 is tilted by a 45° angle relative to the axes 380a and 380b. The tilted surface 360c acts as a totally internally reflective (TIR) surface to reflect the collimated light toward a second lens portion 360d of the optical beam transformer 360. The second lens portion 360d focuses the reflected light into an end of an optical fiber (not shown) mechanically coupled directly or by a ferrule (not shown) to the opening 380. In a receive mode, divergent light passing out of the end of an optical fiber (not shown) is collimated as it passes into the second lens portion 360d of the optical beam transformer 360. The tilted TIR surface 360c reflects the collimated light toward the first lens portion 360b, which focuses the reflected light onto an O/E converter (not shown). As indicated above, the FOT module may be an optical transceiver module that has both transmitter and receiver functionality, in which case the filled cavity operates on light propagating in both of the above-described directions.

Figure 4:
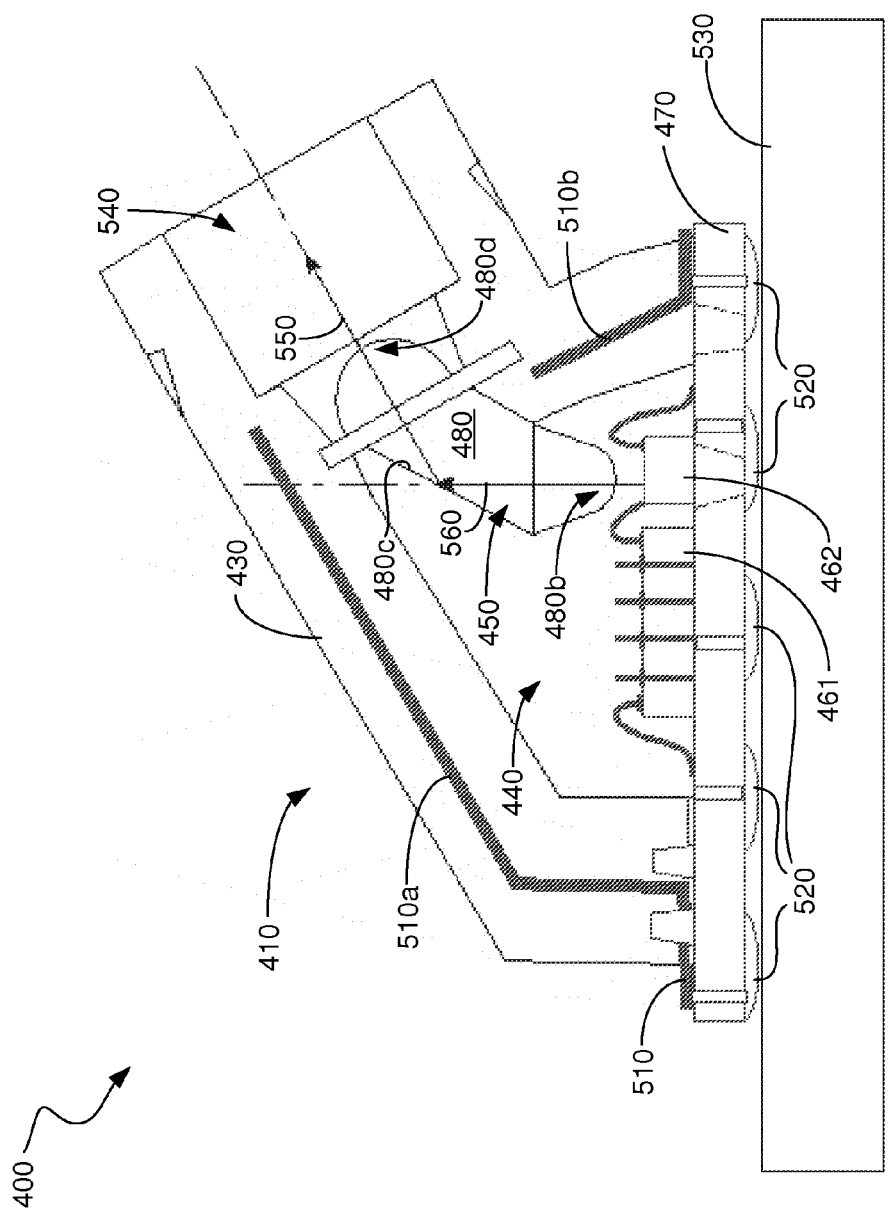
FIG. 4 illustrates a side plan view of an FOT module in accordance with another illustrative embodiment.

FIG. 4 illustrates a side plan view of an FOT module 400 in accordance with another illustrative embodiment. The FOT module 400 has a cover 410 that is similar to the cover 300 (FIG. 3) in that the cover 410 is made up of a nontransparent molded part 430 having a first cavity 440 and a second cavity 450 formed therein. The nontransparent molded part 430 comprises the same material as the nontransparent molded part 30 shown in FIGS. 1A, 1B and 2. Like the first cavity 40 shown in FIGS. 1A-2, the first cavity 440 provides space for components 461 and 462 mounted on an upper surface of a mounting structure 470 to which the cover 400 is secured. In accordance with this illustrative embodiment, the mounting structure 470 is a multi-layer PCB.

Like the second cavity 50 shown in FIGS. 1A-2, the second cavity 450 is filled with a transparent elastomeric material (not visible in FIG. 4) to form an optical beam transformer 480. The optical beam transformer 480 performs the functions described above with reference to FIGS. 1A-2 of optically coupling light between an end of an optical fiber (not shown) and an active optical device, which corresponds to component 462 in FIG. 4. The transparent elastomeric material that is used to fill the second cavity 450 is the same as the transparent elastomeric material that is used to fill the second cavity 50 shown in FIGS. 1A-2. The molded cover 410 may be made in the same manner, described above, in which the molded cover 10 is made.

A leadframe 510 of the FOT module 400 has metal leadframe portions 510a and 510b that are embedded in the nontransparent molded part 430. The embedded metal leadframe portions 510a and 510b help secure the leadframe 510 to the cover 410 and provide electromagnetic interference (EMI) shielding. Electrical contacts (not shown) disposed on the multi-layer PCB 470 are soldered to the metal leadframe portions 510a and 510b and are connected by vias (not shown) to a ground plane (not shown) in the multi-layer PCB 470. These connections between the metal leadframe portions 510a and 510b and the ground plane in the multi-layer PCB 470 form an EMI shielding cage inside of the FOT module 400. Solder bumps 520 arranged in a ball grid array electrically interconnect electrical contacts of the PCB 470 to electrical contacts (not shown) of a motherboard PCB 530 for communicating data signals and distributing electrical power from the motherboard PCB 530 to the FOT module 400.

An opening 540 formed in the cover 410 is configured for receiving an end of an optical fiber (not shown) or a ferrule (not shown) that holds the end of an optical fiber. The opening 540 may have a shape that is identical or similar to the shape of the opening 120 shown in FIGS. 1A-2. An optical axis 550 of the opening 540 (also the optical axis of the ferrule and/or fiber) is at a 120° angle to the optical axis 560 of the component 462, which is the active optical device of the FOT module 400. If the FOT module 400 is configured as an optical transmitter, divergent light produced by the component 462, which, in this case, is an E/O converter, is collimated as it passes into a first lens portion 480b of the optical beam transformer 480. A surface 480c of the optical beam transformer 480 is tilted by a 60° angle relative to the optical axes 550 and 560. The tilted surface 480c acts as a TIR surface to reflect the collimated light toward a second lens portion 480d of the optical beam transformer 480. The second lens portion 480d focuses the reflected light into the end of an optical fiber (not shown) coupled directly or via a ferrule to the opening 540.

If the FOT module 400 is configured as an optical receiver, divergent light passing out of the end of an optical fiber is collimated as it passes into the second lens portion 480d of the optical beam transformer 480. The TIR surface 480c reflects the collimated light toward the first lens portion 480b of the optical beam transformer 480. The first lens portion 480b focuses the reflected light onto the component 462, which, in this case, is an O/E converter. While a single TIR surface 480c is shown in FIG. 4, multiple TIR surfaces that are at various angles relative to the optical axes 550 and 560 may be used to control the manner in which light is reflected within the optical beam transformer 480. For example, a multi-faceted TIR surface may be used for this purpose.

Figure 5:
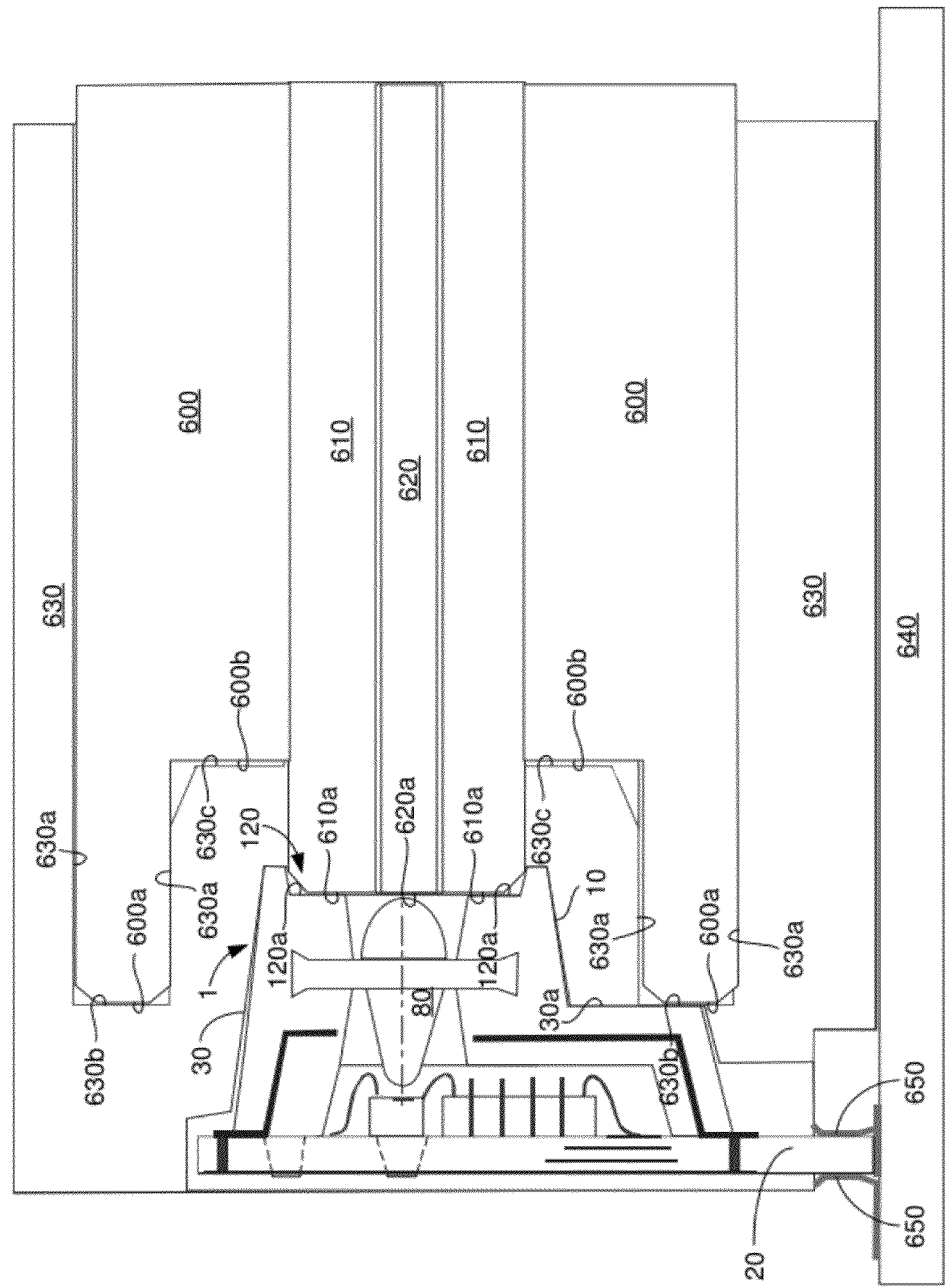
FIG. 5 illustrates a cross-sectional side view of the FOT module shown in FIGS. 1A and 1B connected to a plug having a ferrule secured thereto.

FIG. 5 illustrates a cross-sectional side view an illustrative embodiment of the FOT module 1 shown in FIGS. 1A and 1B connected to a plug header 600 having a ferrule 610 secured thereto. Like numerals in FIGS. 1A, 1B and 5 represent like features or elements. A portion of an optical fiber 620 is held within the ferrule 610 such that an end 620a of the optical fiber 620 is flush with an end 610a of the ferrule 610. The FOT module 1 is positioned within an FOT module header 630. As mentioned above with reference to FIGS. 1A and 1B, the ledge 120a of the opening 120 formed in the cover 10 is spaced at least 1.3 mm apart from the outer surface 30a of the nontransparent molded part 30. The surface 30a abuts a portion of the end 600a of the plug header 600. As indicated above, the length of the optical beam transformer 80 is based on this distance between the surface 30a of the nontransparent molded part 30 and the end 600a of the plug header 600.

The plug header 600 has a recessed surface 600b that is separated by a particular distance from the end 600a of the plug header 600. The FOT module header 630 has a circular cutout region 630a formed therein that defines an inner surface 630b and an outer surface 630c of the FOT module header 630. The inner surface 630b and the outer surface 630c of the FOT module header 630 are separated by a particular distance. These distances are equal to one another such that when the plug header 600 is mated with the FOT module header 630, the end 600a of the plug header 600 abuts the inner surface 630b of the FOT module header 630 and the recessed surface 600b of the plug header 600 abuts the outer surface 630c of the FOT module header 630. This mating feature ensures that the end 610a of the ferrule 610 is properly mated with the opening 120 when the plug header 600 is mated with the FOT module header 630, and eliminates the possibility that the end 620a of the optical fiber 620 will be damaged during "blind" mating of the plug header 600 with the FOT module header 630. This feature of providing blind mating capability while also protecting the end 620a of the optical fiber 620 is known as providing "Kojiri" protection. The type of assembly shown in FIG. 5 is particularly well suited for use in the automotive industry in which connections are often made by hand without the aid of active alignment systems.

In the embodiment of FIG. 5, the FOT module header 630 is mounted on a side thereof to a motherboard PCB 640. Electrical contacts (not shown) of the multi-layer PCB 20 are connected by electrical leads 650 to electrical contacts (not shown) of a motherboard PCB 640. These electrical connections allow data signals to be communicated and power to be distributed from the motherboard PCB 640 to the multi-layer PCB 20 of the FOT module 1.

Many variations may be made to the configurations of the FOT modules shown in FIGS. 1A-5 within the scope of the invention. For example, the covers 10, 300 and 410 may have a variety of shapes and may be secured to a variety of different mounting structures. Also, the FOT modules may include features or components that are not shown in the figures, such as additional housing structures, electromagnetic interference (EMI) shielding structures, additional circuit boards, etc.

It should be noted that the invention has been described with reference to a few illustrative embodiments in order to demonstrate the principles and concepts of the invention. As indicated above, the invention is not limited to the embodiments described herein. For example, although the invention has been described with reference to particular FOT module configurations shown in FIGS. 1A-5, the invention is not limited to these particular configurations. Also, the optical beam transformers 80, 360 and 480 may have a variety of configurations to provide a variety of optical characteristics, as will be understood by persons skilled in the art in view of the description being provided herein. Persons of ordinary skill in the art will understand in view of the description provided herein the manner in which these configurations may be modified while still achieving the aforementioned goals and advantages. All such modifications are within the scope of the invention.

What is claimed is:

1. A fiber optic transceiver (FOT) module comprising:
    a mounting structure having a mounting structure body and at least a mounting surface, the mounting structure body having a coefficient of thermal expansion (CTE);
    at least a first active optical device mounted on the mounting surface;
    a cover secured to the mounting structure and covering said at least one active optical device, the cover comprising a nontransparent molded part having first and second cavities formed therein, the first cavity providing space for at least the first active optical device mounted on the mounting surface of the mounting structure, the nontransparent molded part being nontransparent to a primary wavelength of light used by the FOT module, the nontransparent molded part comprising a material that has a CTE that matches, or substantially matches, the CTE of the mounting structure body, and wherein the cover has an opening formed therein for mechanically coupling an end of an optical waveguide to the cover; and
    a transparent elastomeric material disposed in the second cavity, the transparent elastomeric material being transparent to the primary wavelength of light used by the FOT module, wherein the transparent elastomeric material has an elasticity that allows it to expand and contract if the second cavity of the cover expands and contracts, and wherein the second cavity filled with the transparent elastomeric material operates as an optical beam transformer for transforming a light beam and coupling the transformed light beam between the active optical device and the end of the optical waveguide.

2. The FOT module of claim 1, wherein the nontransparent molded part comprises a plastic material.

3. The FOT module of claim 1, further comprising a meander structure formed in the cover and connected to the first cavity to help equalize pressure within the first cavity.

4. The FOT module of claim 3, wherein the first cavity is at least partially filled with a silicone material such that at least some of the silicone material is interposed between the active optical device and the optical beam transformer.

5. The FOT module of claim 1, wherein the active optical device is an electrical-to-optical (E/O) converter, and wherein the optical beam transformer has a first lens portion positioned in close proximity to the E/O converter and a second lens portion positioned in close proximity to the opening formed in the cover, the first and second lens portions having a common optical axis, and wherein the E/O converter produces light of the primary wavelength, the first lens portion collimating light produced by the E/O converter into a collimated beam of light, the second lens portion receiving the collimated beam of light and focusing the collimated beam of light to a focal point within the opening formed in the cover.

6. The FOT module of claim 1, wherein the active optical device is an electrical-to-optical (E/O) converter, and wherein the optical beam transformer has a first lens portion positioned in close proximity to the E/O converter, a second lens portion positioned in close proximity to the opening formed in the cover, and at least one tilted reflective surface disposed between the first and second lens portions, wherein the first and second lens portions have first and second optical axes, respectively, that are at non-zero angles to the tilted TIR surface, and wherein the E/O converter produces light of the primary wavelength, the first lens portion collimating light produced by the E/O converter into a collimated beam of light and directing the collimated beam of light along the first optical axis onto the tilted reflective surface, the tilted reflective surface reflecting the collimated beam of light received thereby onto the second lens portion, the second lens portion receiving the collimated beam of light and focusing the collimated beam of light to a focal point within the opening formed in the cover.

7. The FOT module of claim 6, wherein the non-zero angles are less than 45°.

8. The FOT module of claim 6, wherein the non-zero angles are greater than 45°.

9. The FOT module of claim 6, wherein the non-zero angles are 45° or approximately 45°.

10. The FOT module of claim 6, wherein the non-zero angles are 60° or approximately 60°.

11. The FOT module of claim 1, further comprising a ferrule secured to the opening formed in the cover, the ferrule being configured to mechanically couple the end of the optical waveguide to the cover.

12. The FOT module of claim 1, wherein the mounting structure comprises a printed circuit board (PCB).

13. The FOT module of claim 1, wherein the PCB is a multi-layer PCB.

14. The FOT module of claim 1, wherein the mounting structure comprises a premolded leadframe.

15. The FOT module of claim 1, wherein the active optical device is an optical-to-electrical (O/E) converter, and wherein the optical beam transformer has a first lens portion positioned in close proximity to the O/E converter and a second lens portion positioned in close proximity to the opening formed in the cover, the first and second lens portions having a common optical axis, the second lens portion collimating light passing out of the end of the optical waveguide into a collimated beam of light, the first lens portion receiving the collimated beam of light and focusing the collimated beam of light onto the O/E converter, the O/E converter converting the light focused therein into an electrical signal.

16. The FOT module of claim 1, wherein the active optical device is an optical-to-electrical (O/E) converter, and wherein the optical beam transformer has a first lens portion positioned in close proximity to the O/E converter, a second lens portion positioned in close proximity to the opening formed in the cover, and at least one tilted reflective surface disposed between the first and second lens portions, wherein the first and second lens portions have first and second optical axes, respectively, that are at non-zero angles to the tilted reflective surface, and wherein the second lens portion collimates light passing out of the end of the optical waveguide into a collimated beam of light and directs the collimated beam of light along the second optical axis onto the tilted reflective surface, the tilted reflective surface reflecting the collimated beam of light received thereby onto the first lens portion, the first lens portion receiving the collimated beam of light and focusing the collimated beam of light onto the O/E converter, the O/E converter converting the light focused therein into an electrical signal.

17. The FOT module of claim 16, wherein the non-zero angles are less than 45°.

18. The FOT module of claim 16, wherein the non-zero angles are greater than 45°.

19. The FOT module of claim 16, wherein the non-zero angles are 45° or approximately 45°.

20. The FOT module of claim 16, wherein the non-zero angles are 60° or approximately 60°.

* * * * *